(12) United States Patent
Sugano

(10) Patent No.: US 6,870,468 B2
(45) Date of Patent: Mar. 22, 2005

(54) ADAPTIVE CRUISE SPEED CONTROLLING APPARATUS AND METHOD FOR AUTOMOTIVE VEHICLE

(75) Inventor: Takeshi Sugano, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 36 days.

(21) Appl. No.: 10/639,634

(22) Filed: Aug. 13, 2003

(65) Prior Publication Data

US 2004/0064240 A1 Apr. 1, 2004

(30) Foreign Application Priority Data

Sep. 27, 2002 (JP) ........................................ 2002-283258
Sep. 27, 2002 (JP) ........................................ 2002-283259

(51) Int. Cl.[7] ................................................ B60Q 1/00
(52) U.S. Cl. ........................... 340/435; 180/274; 701/96
(58) Field of Search ............................. 340/435, 425.5; 180/274, 277, 271; 701/96

(56) References Cited

U.S. PATENT DOCUMENTS

| | | | |
|---|---|---|---|
| 6,463,369 B2 | * 10/2002 | Sadano et al. | 701/28 |
| 6,473,686 B2 | * 10/2002 | Adachi et al. | 701/96 |
| 6,477,260 B1 | 11/2002 | Shimomura | |
| 2002/0173896 A1 | * 11/2002 | Ishizu et al. | 701/96 |
| 2003/0038714 A1 | * 2/2003 | Matsumoto et al. | 340/435 |

FOREIGN PATENT DOCUMENTS

| | | |
|---|---|---|
| JP | 7-186775 A | 7/1995 |
| JP | 11-20503 A | 1/1999 |

OTHER PUBLICATIONS

Yoshiyuki Sogawa et al., "Forward Direction Recognition System with Stereo Vision for Automobiles", Japanese Automotive Technology, Apr. 2002, pp. 34–39, vol. 56–No. 4.

* cited by examiner

*Primary Examiner*—Jeffery Hofsass
*Assistant Examiner*—Jennifer Stone
(74) *Attorney, Agent, or Firm*—Foley & Lardner LLP

(57) ABSTRACT

In adaptive cruise speed controlling apparatus and method for an automotive vehicle, a target vehicular velocity is set in such a way that an addition value of a difference between a target inter-vehicle distance from the vehicle to a preceding vehicle, the preceding vehicle running ahead of the vehicle on the same traffic lane, and an actual inter-vehicle distance thereof multiplied by a first gain and a relative velocity between the vehicle and the preceding vehicle multiplied by a second gain is included in the set vehicular velocity and the first and second gains are set to control a vehicular driving force to make the inter-vehicle distance substantially equal to the target inter-vehicle distance and to converge the inter-vehicle distance into the target inter-vehicle distance within a predetermined small overshoot crossing the target inter-vehicle distance when a size of an external form of the preceding vehicle is larger than a predetermined size.

20 Claims, 10 Drawing Sheets

B

ADAPTIVE CRUISE SPEED CONTROLLING APPARATUS AND METHOD FOR AUTOMOTIVE VEHICLE

BACKGROUND OF THE INVENTION

1. Field of the Invention

The present invention relates to adaptive cruise speed controlling apparatus and method for an automotive vehicle to follow a preceding vehicle, the preceding vehicle running ahead of the vehicle on the same traffic lane, while maintaining a target inter-vehicle distance between the vehicle itself (also called, a host vehicle) and the preceding vehicle.

2. Description of the Related Art

A Japanese Patent Application First Publication No. Heisei 11-20503 published on Jan. 26, 1999 exemplifies a previously proposed adaptive cruise speed controlling apparatus.

In the above-described Japanese Patent Application Publication, a first gain is multiplied with a difference between an actual inter-vehicle distance from the host vehicle to the preceding vehicle and the target inter-vehicle distance. The multiplied difference is added to a relative velocity of the preceding vehicle to the host vehicle which is multiplied with a second gain. The added value provides a term of a setting of a target vehicular velocity. A regulator such as to control the braking or driving force of the host vehicle so that the vehicular velocity of the host vehicle is made coincident with the target vehicular velocity is used to make the host vehicle follow the preceding vehicle.

SUMMARY OF THE INVENTION

During a following run of the vehicle to the preceding vehicle, it is general that, as a size of the preceding vehicle becomes larger, a strange (undesirable) feeling is given to the vehicle driver such that the inter-vehicle distance between the host vehicle and the preceding vehicle is short. Therefore, when the host vehicle approaches to, for example, a large-sized preceding vehicle, the vehicle driver feels that the host vehicle would excessively be approaching to the preceding vehicle and the excessive approach may give a sense of incompatibility to the vehicle driver.

It is, hence, an object of the present invention to provide adaptive cruise speed controlling apparatus and method for an automotive vehicle which are capable of preventing and suppressing the sense of the incompatibility to the driver even when the preceding vehicle to be followed by the host vehicle is the large sized preceding vehicle.

According to one aspect of the present invention, there is provided an adaptive cruise speed controlling apparatus for an automotive vehicle, comprising: a target vehicular velocity setting section that sets a target vehicular velocity in such a way that an addition value of a difference between a target inter-vehicle distance from the vehicle to a preceding vehicle, the preceding vehicle running ahead of the vehicle on the same traffic lane, and an actual inter-vehicle distance thereof multiplied by a first gain and a relative velocity between the vehicle and the preceding vehicle multiplied by a second gain is included in the set vehicular velocity; and a control gain setting section that sets the first and second gains to control a vehicular driving force to make the inter-vehicle distance substantially equal to the target inter-vehicle distance and to converge the inter-vehicle distance into the target inter-vehicle distance within a predetermined small overshoot crossing the target inter-vehicle distance when a size of an external form of the preceding vehicle is larger than a predetermined size.

According to another aspect of the present invention, there is provided an adaptive cruise speed controlling apparatus for an automotive vehicle, comprising: a target inter-vehicle distance setting section that sets a target inter-vehicle distance between the vehicle and a preceding vehicle which is running ahead of the vehicle at the same traffic lane; an inter-vehicle distance detecting section that detects an actual inter-vehicle distance between the vehicle and the preceding vehicle; a relative velocity detecting section that detects a relative velocity of the vehicle to the preceding vehicle; a target vehicular velocity setting section that sets a target vehicular velocity in such a way that an addition value between a value of difference between the target inter-vehicle distance set by the target inter-vehicle distance setting section and the inter-vehicle distance detected by the inter-vehicle distance detecting section multiplied with a first gain and a value of a second gain multiplied with the relative velocity detected by the relative velocity detecting section is included in the set vehicular velocity; a vehicular velocity detecting section that detects the vehicular velocity of the vehicle; a vehicular driving force controlling section that controls a vehicular driving force to make the inter-vehicle distance detected by the inter-vehicle distance detecting section substantially equal to the target inter-vehicle distance set by the target inter-vehicle distance setting section and to converge the inter-vehicle distance detected by the inter-vehicle distance detecting section into the target inter-vehicle distance set by the target inter-vehicle distance setting section; and a preceding vehicle external form detecting section that detects a magnitude of an external form of the preceding vehicle, the target vehicular velocity setting section setting the first and second gains in such a manner that the inter-vehicle distance is smoothly converged within a predetermined small overshoot crossing the target inter-vehicle distance into the target inter-vehicle distance when the magnitude of the external form of the preceding vehicle detected by the preceding vehicle external form detecting section is larger than a predetermined magnitude.

According to a further another aspect of the present invention, there is provided an adaptive cruise speed controlling method for an automotive vehicle, comprising: setting a target vehicular velocity in such a way that an addition value of a difference between a target inter-vehicle distance from the vehicle to a preceding vehicle, the preceding vehicle running ahead of the vehicle on the same traffic lane, and an actual inter-vehicle distance thereof multiplied by a first gain and a relative velocity between the vehicle and the preceding vehicle multiplied by a second gain is included in the set vehicular velocity; and setting the first and second gains to control a vehicular driving force to make the inter-vehicle distance substantially equal to the target inter-vehicle distance and to converge the inter-vehicle distance into the target inter-vehicle distance with a relatively small overshoot crossing the target inter-vehicle distance when a size of the preceding vehicle is larger than a predetermined size.

According to a still another aspect of the present invention, there is provided an adaptive cruise speed controlling method for an automotive vehicle, comprising: adaptive cruise speed controlling method for an automotive vehicle, comprising: setting a target inter-vehicle distance between the vehicle and a preceding vehicle which is running ahead of the vehicle at the same traffic lane; detecting an actual inter-vehicle distance between the vehicle and the preceding vehicle; detecting a relative velocity of the vehicle to the preceding vehicle; setting a target vehicular velocity in such a way that an addition value between a value of difference between the set target inter-vehicle distance and the detected inter-vehicle distance multiplied with a first gain and a value of a second gain multiplied with the detected relative velocity is included in the set vehicular velocity; detecting the vehicular velocity of the vehicle; controlling a vehicular driving force to make the detected inter-vehicle distance substantially equal to the set target inter-vehicle distance and to converge the detected inter-vehicle distance into the set target inter-vehicle distance; and detecting a magnitude of an external form of the preceding vehicle, at the target vehicular velocity setting, the first and second gains being set in such a manner that the inter-vehicle distance is smoothly converged within a predetermined small overshoot crossing the target inter-vehicle distance into the target inter-vehicle distance when the detected magnitude of the external form of the preceding vehicle is larger than a predetermined magnitude.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
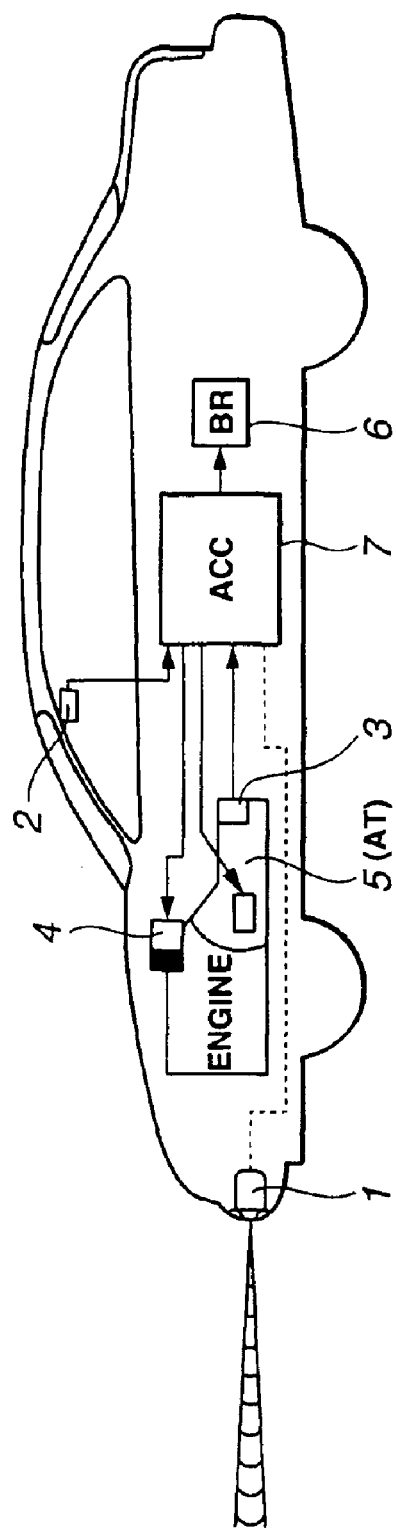
FIG. 1 shows a rough configuration view of an automotive vehicle to which an adaptive cruise speed controlling apparatus in a first preferred embodiment according to the present invention is applicable.

FIG. 1 shows a rough configuration view of a first preferred embodiment of an adaptive cruise speed controlling apparatus (or called, preceding vehicle following controlling apparatus) for an automotive vehicle according to the present invention.

In FIG. 1, an inter-vehicle distance sensor 1 is constituted by a sensor head of a laser type in which a reflected light from a preceding vehicle which is running ahead of the host vehicle on the same traffic lane is received by sweepingly radiating a laser light beam.

Figure 3:
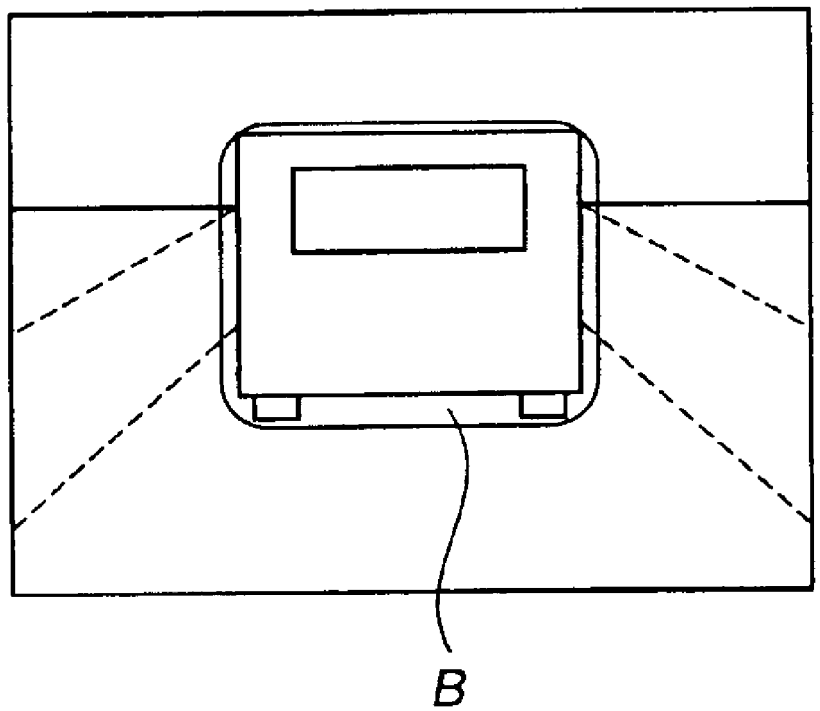
FIG. 3 is an explanatory view of an image processing executed in an image processing section shown in FIG. 2.

It is noted that the actual inter-vehicle distance may be measured utilizing an electric wave or an ultra-sonic wave. A stereo camera unit 2 is attached onto a roof portion of the vehicle above a rear view mirror within a passenger compartment. Two CCD (Charge Coupled Device) cameras photograph a road situation in front of the vehicle. Vehicular velocity sensor 3 is attached onto an output axle of an automatic transmission (AT) 5 and outputs a pulse train having a period T in accordance with a revolution speed of the output axle of transmission 5. A throttle actuator 4 opens or closes a throttle valve in accordance with the throttle opening angle signal to adjust an engine output. Automatic transmission 5 changes a shift ratio (gear ratio) thereof in accordance with the vehicular velocity and throttle valve opening angle. A brake unit (BR) 6 is a unit to develop the braking force on the vehicle. An adaptive cruise speed controller (ACC) 7 includes a microcomputer and its peripheral circuitry, derives a target vehicular velocity on the basis of the detected values of the inter-vehicle distance and the vehicular velocity and controls a throttle actuator 4, automatic transmission (AT) 5, and a brake unit (BR) 6. Adaptive cruise speed controller 7 constitutes control sections 11, 21, 31, 50, and 51 in the software form of the microcomputer. Distance measurement (inter-vehicle distance) signal processing section 11 measures a time duration from a time at which the laser light is swept and radiated by means of inter-vehicle distance sensor 1 to a time at which the reflected light of the preceding vehicle is received to calculate the inter-vehicle distance. An image processing section 21 detects a rear-surface area B of the preceding vehicle from an image in front of the vehicle photographed by means of stereo camera unit 2, as shown in FIG. 3. A method of detecting the preceding vehicle is exemplified by a U.S. Pat. No. 6,477,260 to Noriko Shimomura issued on Nov. 5, 2002(, the disclosure of which is herein incorporated by reference). Since the method of detecting the preceding vehicle is well known, the detailed explanation thereof will herein be omitted.

Vehicular velocity signal processing section 31 measures a period of time between each vehicular velocity pulse from a vehicular velocity sensor 3 to measure a period of time between each vehicular velocity pulse from a vehicular velocity sensor 3 to measure a vehicular velocity of the host vehicle. Preceding vehicle following controlling section 50 includes a relative velocity calculating section 501, inter-vehicle distance controlling section 502, and a target inter-vehicle distance setting section 503 so as to calculate target inter-vehicle distance L* and target vehicular velocity V* on the basis of the rear-surface area B of the preceding vehicle, inter-vehicle distance L, and the vehicular velocity V of the host vehicle.

Relative velocity calculating section 501 calculates relative velocity ΔV to the preceding vehicle on the basis of inter-vehicle distance L detected by means of measurement distance signal processing section 11. Inter-vehicle distance controlling section 502 calculates target vehicular velocity V* to make inter-vehicle distance L coincident with target inter-vehicle distance L* with the rear surface area B and relative velocity ΔV taken into consideration. Target inter-vehicle distance setting section 503 sets target inter-vehicle distance L* in accordance with vehicular velocity VT of the preceding vehicle or the vehicular velocity Vehicular velocity controlling section 51 controls the opening angle of the throttle actuator 4, the gear ratio of automatic transmission 5, and the driving force of braking unit.

Figure 4:
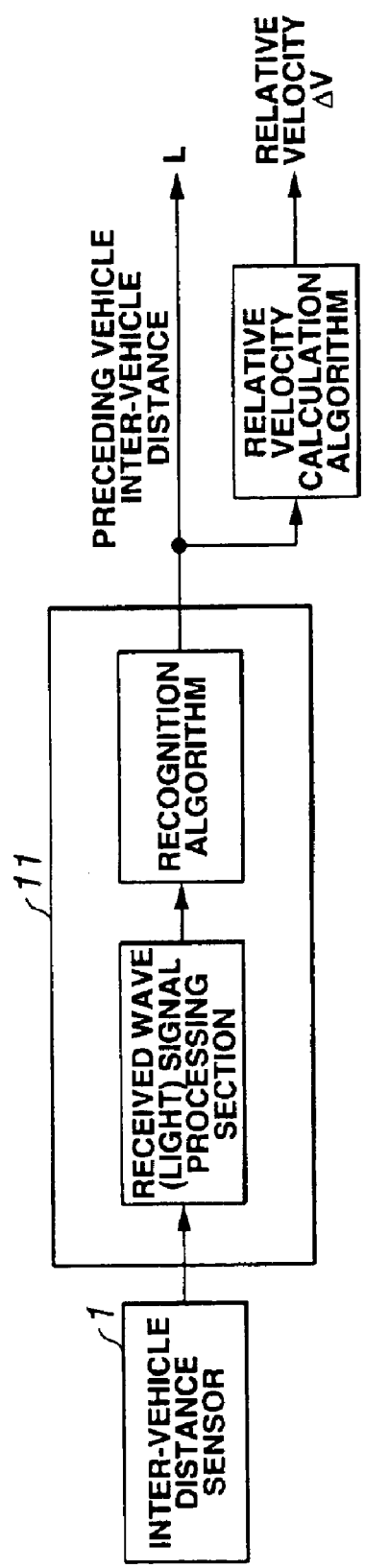
FIG. 4 is a functional block diagram for explaining a measured (inter-vehicle) distance signal processing section shown in FIG. 2.
Figure 5:
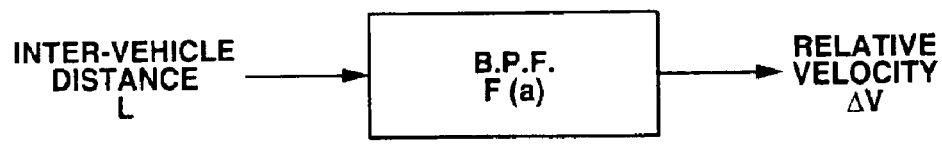
FIG. 5 is a functional block diagram for explaining a relative velocity calculating section shown in FIG. 2.

Next, measurement distance signal processing section 11 and preceding vehicle following control section 50 will be described in details, First, a calculation method of the relative velocity ΔV between the vehicle and the preceding vehicle will be described below. As shown in FIGS. 4 and 5, inter-vehicle distance L to the preceding vehicle calculated by measurement distance signal processing section 11 is inputted and a band pass filter (BPF) or a high pass filter (HPF) is used to derive relative velocity ΔV approximately. With inter-vehicle distance L to the preceding vehicle inputted, the relative velocity ΔV can be approximated. The band pass filter (BPF) to derive relative velocity ΔV, for example, can be achieved by using a transfer function described below.

$$F(s) = \omega c^2 s / (s^2 + 2\xi \omega c s + \omega c^2) \quad (1).$$

Figure 2:
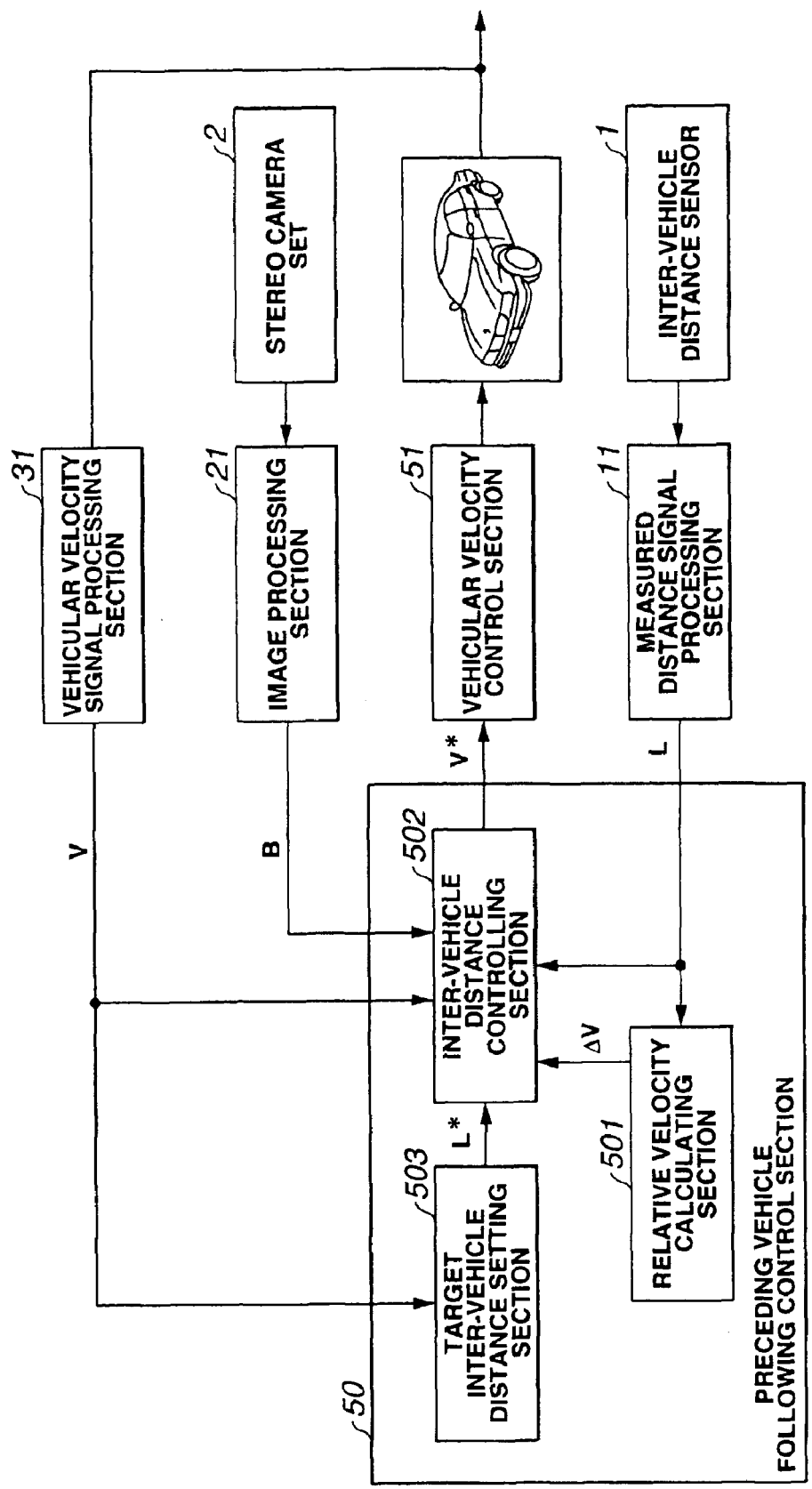
FIG. 2 is a functional block diagram of the adaptive cruise speed controlling apparatus in the first embodiment according to the present invention.

In equation (1), $\omega c = 2\pi fc$ and s denotes a Laplace transform operator. It is noted that a cut-off frequency fc on the filter transfer function is determined from a magnitude of a noise component included in inter-vehicle distance L and from an allowance value of a G (Gravity) variation of a vehicular body forward-and-rearward (longitudinal direction) in a short period of time. Next, while inter-vehicle distance L is maintained at target inter-vehicle distance L*, control rules to follow the preceding vehicle will be described. The structure of the control system includes independently of the preceding vehicle following control section 50 and vehicular velocity controlling section 51 mutually independently as shown in FIG. 2. It is noted that the output of the preceding vehicle following control section 50 is the target vehicular velocity (vehicular velocity command value) V* and the inter-vehicle distance L is not directly controlled.

Figure 6:
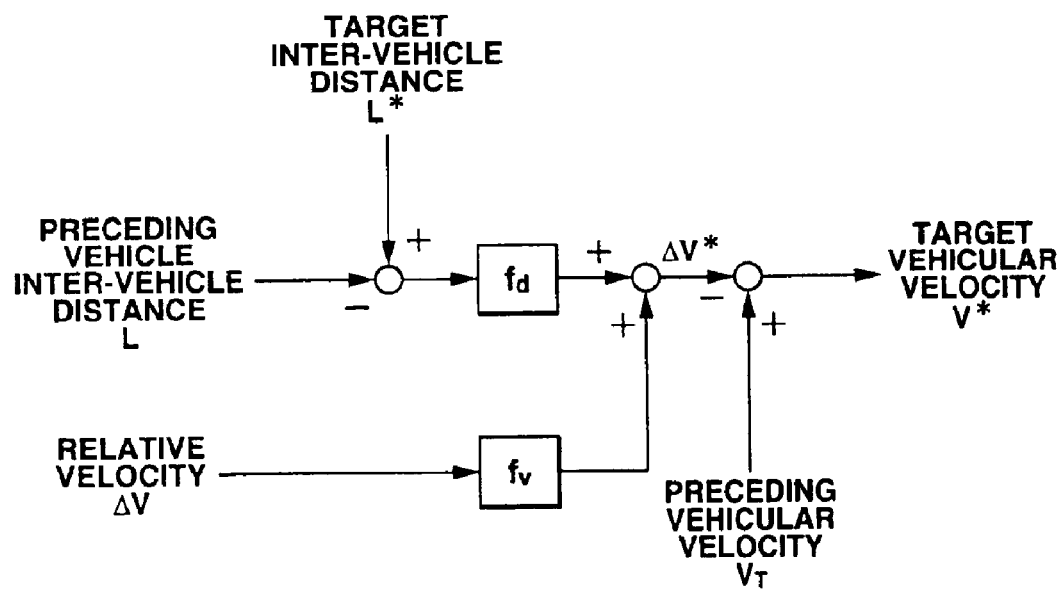
FIG. 6 is a functional block diagram for explaining an inter-vehicle distance controlling section shown in FIG. 2.
Figure 7:
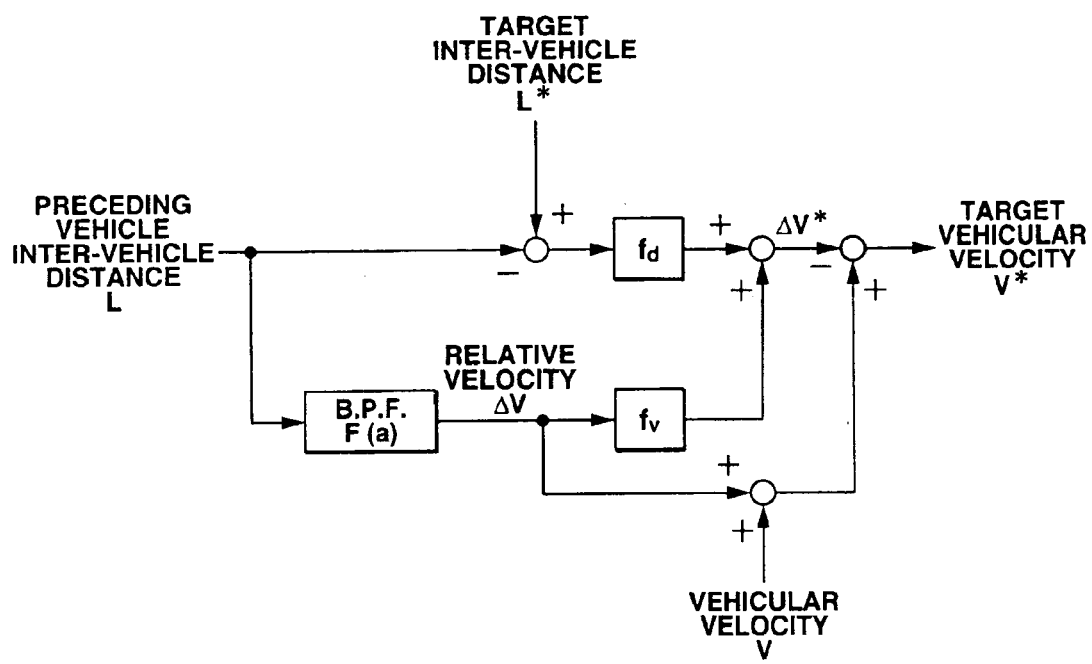
FIG. 7 is a functional block diagram for explaining an inter-vehicle distance controlling section shown in FIG. 2.

Inter-vehicle distance controlling section 502 of the preceding vehicle following control section 50 calculates a target vehicular velocity V* (of the host vehicle) to follow the preceding vehicle with inter-vehicle distance L maintained at target value L* thereof. Specifically, as shown in FIG. 6, an addition value ΔV* between a difference between target inter-vehicle distance and actual inter-vehicle distance (L*−L) multiplied by a control gain (first gain) fd and another control gain (second gain) fv multiplied with relative velocity ΔV, viz., a difference between vehicular velocity $V_T$ of the preceding vehicle and a target vehicular velocity V*.

$$V^* = V_T - \Delta V^* \quad (2)$$

$$\Delta V^* = fd(L^* - L) + fv \cdot \Delta V,$$

wherein $V_T$ denotes the vehicular velocity of the preceding vehicle. In addition, control gains fd and fv are parameters for determining a following control performance for the preceding vehicle. This system is one-input-and-two-output system which controls two target values (inter-vehicle distance L* and relative velocity ΔV) with a single input (target vehicular velocity). As a control system, a state feedback (regulator) has been used to design the control system.

Hereinafter, a procedure of a control system design will be explained. First, state variables of x1 and x2 of the system are defined in the following equation (3). $x_1 = V_T - V$, $x_2 = L^* - L$ - - - (3). In addition, control input (an output of the controller) ΔV* is defined as follows: $\Delta V^* = V_T - V^*$ - - - (4). In equation (4), inter-vehicle distance L can be described as follows: $L = \int (V_T - V) dt + Lo$ - - - (5). In addition, a vehicular velocity servo system can approximately be expressed in a linear transfer function in such a way that actual vehicular velocity V is in a first-order lag with respect to target vehicular velocity V* as expressed in equation (6), for example. $V = 1/(1 + \tau v \cdot s)$ (wherein τv denotes a time constant of a vehicular servo system and s also denotes a differential operator) and $dV/dt = 1/\tau v \, (V^* - V)$ - - - (6). Hence, if vehicular velocity of the preceding vehicle VT is constant, state variable $x_1$ can be described in the following equation (7). $dx_1/dt = -1/\tau v \cdot x_1 + 1/\tau v \cdot \Delta V^*$ - - - (7). If target inter-vehicle distance L* is constant, state variable $x_2$ can be described in the following equation (8) from above equations (3) and (5). $X_2 = -(V_T - V) = -x_1$ - - - (8). Hence, according to equations (7) and (8), the state equation of the system can be described in the following equation from above equations (7) and (8).

$$\frac{d}{dt}\begin{bmatrix} x1 \\ x2 \end{bmatrix} = \begin{bmatrix} -1/\tau_v & 0 \\ -1 & 0 \end{bmatrix}\begin{bmatrix} x1 \\ x2 \end{bmatrix} + \begin{bmatrix} 1/\tau_v \\ 0 \end{bmatrix}\Delta V^* \quad (9)$$

$$\therefore \dot{X} = AX + Bu$$

In equation (9), $$X = \begin{bmatrix} x1 \\ x2 \end{bmatrix}, A = \begin{bmatrix} -1/\tau_v & 0 \\ -1 & 0 \end{bmatrix}, B = \begin{bmatrix} 1/\tau_v \\ 0 \end{bmatrix}, \text{ and}$$

$$u = \Delta V^*$$

Next, the state equation of the whole system for which the state feedback is carried out can be described in the following equation (10).

$$dX/dt = (A + BF)X \quad (10),$$

wherein control input u=FX, F=[fv fd] Hence, the characteristic equation of the whole system can be described from above equation (10). $|sI - A'| = s^2 + (1 - fv)/\tau v \cdot s + fd/\tau v = 0$ - - - (11), wherein A'=A+BF.

$$A' = \begin{bmatrix} (fv - 1)/\tau_v & fv/\tau_V \\ -1 & 0 \end{bmatrix}$$

The vehicular servo system of the vehicular velocity control system 51 can be represented in a linear transfer function. Control gains fd and fv are set in accordance with an equation (12) so that the convergence characteristic such that inter-vehicle distance L converges target value L* and relative velocity ΔV converges into zero on the basis of the transfer characteristic, respectively, gives the characteristic that the designer has intended (damping coefficient (or damping factor) ζ and specific angular frequency ωn). It is noted that damping coefficient ζ is set in a damping coefficient calculation process to be larger when the preceding vehicle is the large-sized truck or vehicle as will be described later.

$fv=1-2\zeta\omega n\cdot\tau v$, $fd=\omega n^2\cdot\tau v$            (12).

Figure 8:
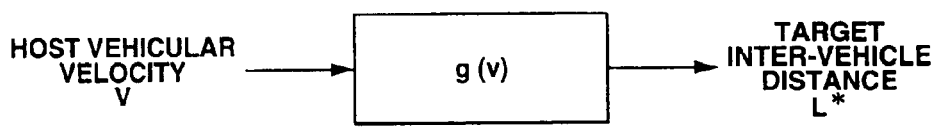
FIG. 8 is a functional block diagram for explaining an operation in a target inter-vehicle distance setting section shown in FIG. 2.

Hence, according to equations (2) and (12), target vehicular velocity V* can be described in the following equation (13). $V_T = V + \Delta V$ - - - (13). From equations (2) and (13), target vehicular velocity V* can be described in the following equation (14). $V^* = V - fd(L^* - L) + (1-fv)\Delta V$ - - - (14). It is noted that target inter-vehicle distance L* may be set using a concept of the inter-vehicle time duration used for an excessive approach to an obstacle with emergency alarm. However, target inter-vehicle distance may be a function of vehicular velocity VT from a viewpoint of no influence on the convergence characteristic of control. Using a velocity of the preceding vehicle $V_T$ defined in above equation (13), target inter-vehicle distance may be set as described in equation (15). $L^* = a \cdot V_T + Lo = a \cdot (V + \Delta V) + Lo$ - - - (15), wherein Lo denotes an initial value of the inter-vehicle distance. Since the vehicular velocity $V_T$ of the preceding vehicle is used from vehicular velocity V and relative velocity $\Delta V$, the influence of noise superposed on the relative velocity detection value is received. Hence, with the function of vehicular velocity V as shown in FIG. 8, target inter-vehicle distance L* may be set in the following equation. $L^* = a \cdot V + Lo$ - - - (16).

Figure 9:
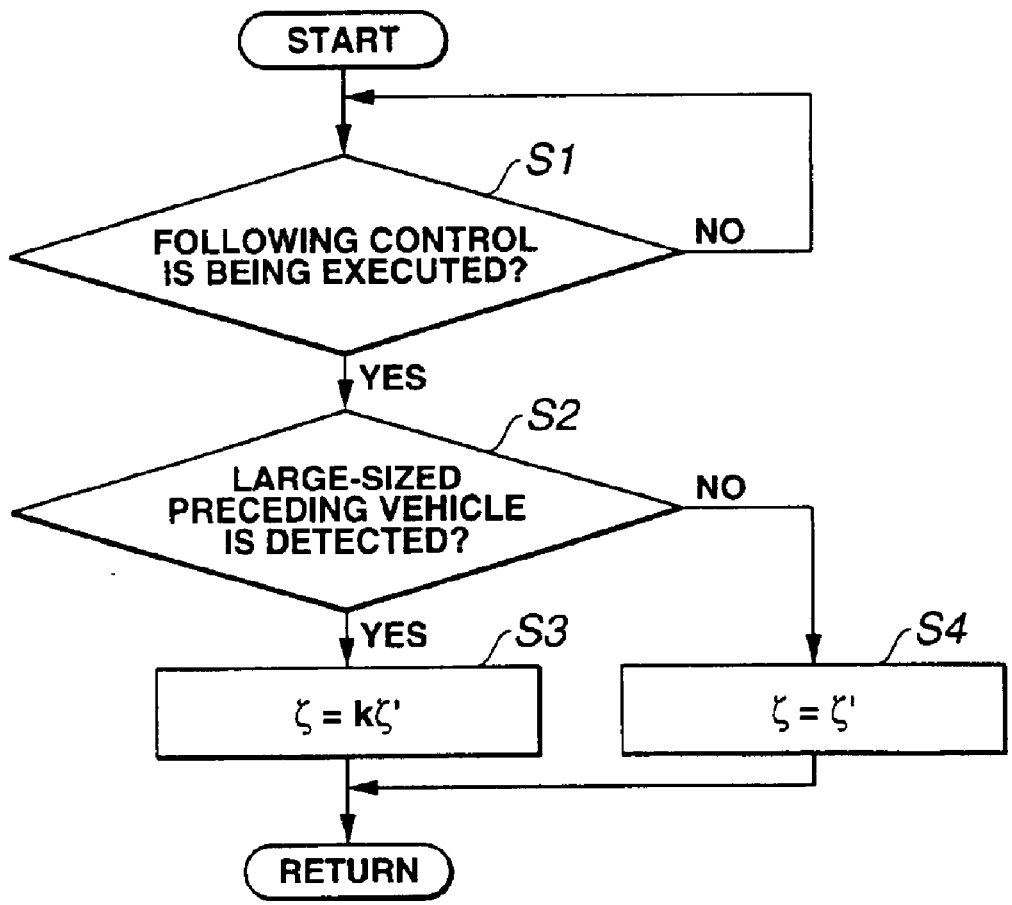
FIG. 9 is an operational flowchart representing a setting process of a damping coefficient executed in an inter-vehicle distance controlling section shown in FIG. 2.

FIG. 9 shows a processing flowchart representing a damping coefficient setting process to set damping coefficient $\zeta$ to set control gains fv and fd. Inter-vehicle distance control section 502 executes this control routine shown in FIG. 9 at a predetermined time interval. At a step S1, controller 7 determines whether a following control is being executed. If Yes (the following control is being executed) at step S1, the routine goes to a step S2. If No at a step S1, the routine at step S1 is repeated. At step S2, controller 7 determines if the large-sized preceding vehicle is detected, viz., the preceding vehicle is a vehicle such that the driver feels that the inter-vehicle distance from the preceding vehicle to the host vehicle is too short. Specifically, controller 7 determines if the rear surface area B is equal to or larger than a predetermined value (for example, twice as large as an average normal car, i.e., about 5.0 m²). If rear surface area B is equal to or larger than the predetermined value, the routine goes to a step S3. If not (No) at step S2, the routine goes to a step S4.

Figure 10:
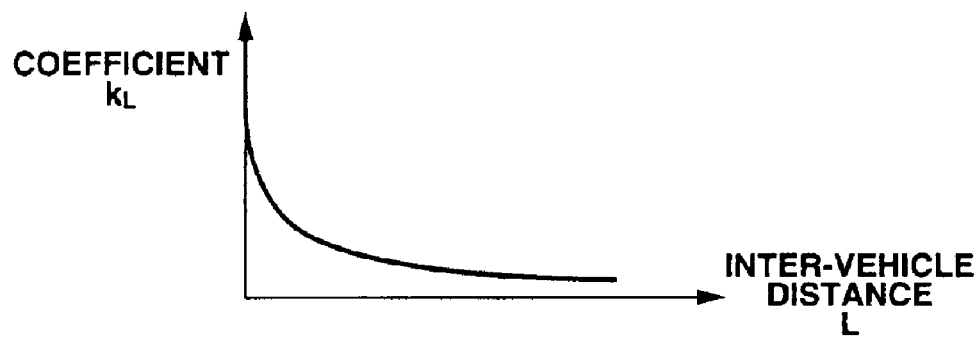
FIG. 10 is a control map of a coefficient $K_L$ used in the damping coefficient setting process shown in FIG. 8 (or a specific angular frequency setting process in a second preferred embodiment of the adaptive cruise speed controlling apparatus) executed by the inter-vehicle distance controlling section shown in FIG. 2.

At step S3, damping coefficient $\zeta$ is set to become larger as inter-vehicle distance L to the preceding vehicle is made smaller. Specifically, controller 7 sets a value multiplied with a correction coefficient K larger than "1" to a predetermined damping coefficient candidate $\zeta'$ (for example, 0.7). Then, the routine returns a main routine (not shown). Correction coefficient K divides a rear-surface area B of the preceding vehicle detected at image processing section 21 divided by an average vehicle's rear surface area A. Thereafter, as shown in FIG. 10, a coefficient $k_L$ is multiplied with a coefficient such that, as the inter-vehicle distance L becomes shorter, another coefficient $K_L$ is multiplied with the divided result. Coefficient $K_L$ becomes larger as the inter-vehicle distance becomes shorter, as shown in FIG. 10.

On the other hand, at step S4, damping coefficient candidate $\zeta'$ is set as damping coefficient $\zeta$ and the routine shown in FIG. 9 is returned to the main routine.

Next, an operation of the adaptive cruise speed controlling apparatus in the first embodiment according to the present invention will be described below.

First, suppose that, while adaptive cruise speed controller 7 performs the following control using normal control gains fd and fv, adaptive cruise speed controller 7 detects the preceding vehicle at inter-vehicle distance L larger than target inter-vehicle distance L* due to a traffic lane change of the traffic lane on which the vehicle and the preceding vehicle are running. At this time, the damping coefficient setting process is executed at inter-vehicle distance control section 502 of adaptive speed cruise controller 7. As shown in FIG. 9, the determinations at steps S1 and S2 indicate "Yes" and, at a step S3, damping coefficient $\zeta$ is set to be larger as the rear-surface area B of the preceding vehicle becomes larger. In addition, control gain fv is set to be smaller in accordance with above equation (12) when damping coefficient $\zeta$ is set to be larger. As described in equation (14), a gain (1−fv) of relative velocity $\Delta V$ in the calculation equation of target vehicular velocity V* is set to be larger. Hence, when host vehicle vehicular velocity V is larger than the vehicular velocity $V_T$ of the preceding vehicle, target vehicular velocity V* is set to be larger.

Then, suppose that, while the adaptive cruise speed controller 7 performs the following control using the normal mode gain values of fd and fv, adaptive cruise speed controller 7 detects the preceding vehicle at inter-vehicle distance L larger than target inter-vehicle distance L*. Then, damping coefficient $\zeta$ is set to be larger as the rear surface area B of the preceding vehicle becomes larger when steps S1 and S2 of FIG. 9 answer "Yes". At step S3, as rear surface area B of preceding vehicle becomes larger, damping coefficient $\zeta$ is set to be larger. In addition, if damping coefficient $\zeta$ is set to be larger, control gain fv is set to be smaller in accordance with above equation (12). As described in equation (14), a gain (1−fv) of relative velocity $\Delta V$ in calculation equation of target vehicular velocity V* is set to be larger. As vehicular velocity V becomes larger than vehicular velocity $V_T$ of the preceding vehicle, target vehicular velocity V* is remarkably reduced. As denoted by a solid line of FIG. 11, an overshoot to target inter-vehicle distance L* when the vehicle is approaching to the preceding vehicle is reduced. A sense such as if the vehicle were excessively approaching to the preceding vehicle is suppressed and the driver's sense of incompatibility can be prevented from being suppressed.

At this time, as the rear surface area B of the preceding vehicle becomes larger, damping coefficient $\zeta$ is set to be larger as the rear surface area B of the preceding vehicle becomes large, in other words, as inter-vehicle distance L to the preceding vehicle is felt to be shorter, the damping coefficient $\zeta$ is set to be larger. Hence, the sense of incompatibility to the vehicle driver can accurately be suppressed.

Figure 11:
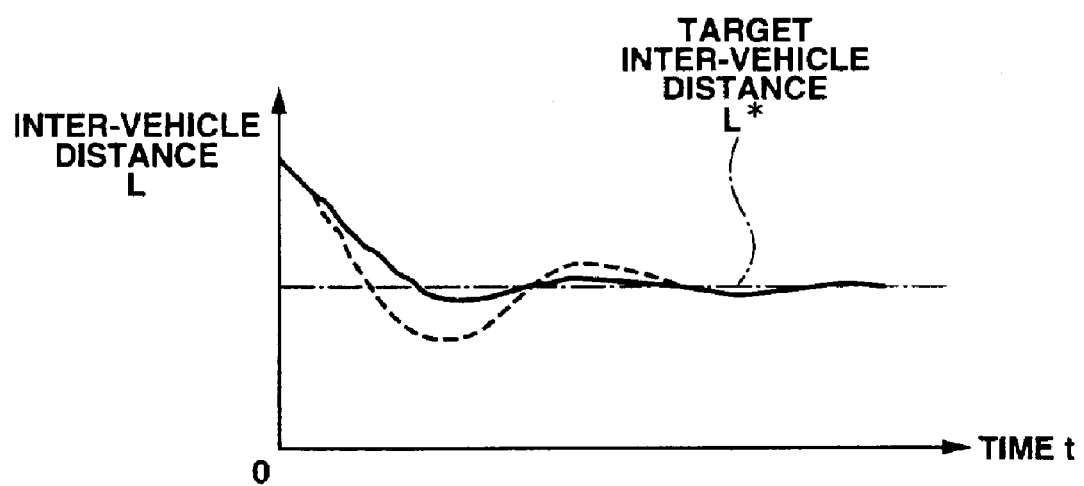
FIG. 11 a characteristic graph for explaining a result of an operation of the adaptive cruise speed controlling apparatus in the fist embodiment.

In a case where damping coefficient $\zeta$ is not modified when the host vehicle is approaching to the large sized preceding vehicle (truck), inter-vehicle distance L from the host vehicle to the large-sized vehicle (truck) overshoots target inter-vehicle distance L*, as denoted by a broken line of FIG. 11. A magnitude of this overshoot is the same as the case where the preceding vehicle is not the large-sized vehicle. As described above, since the vehicle driver feels that, as the size of (rear surface) of the preceding vehicle becomes larger, the inter-vehicle distance becomes short. The sense of incompatibility to the vehicle driver is given, the vehicle driver may feel that the host vehicle is approaching excessively to the large-sized preceding vehicle.

(Second Embodiment)

Figure 12:
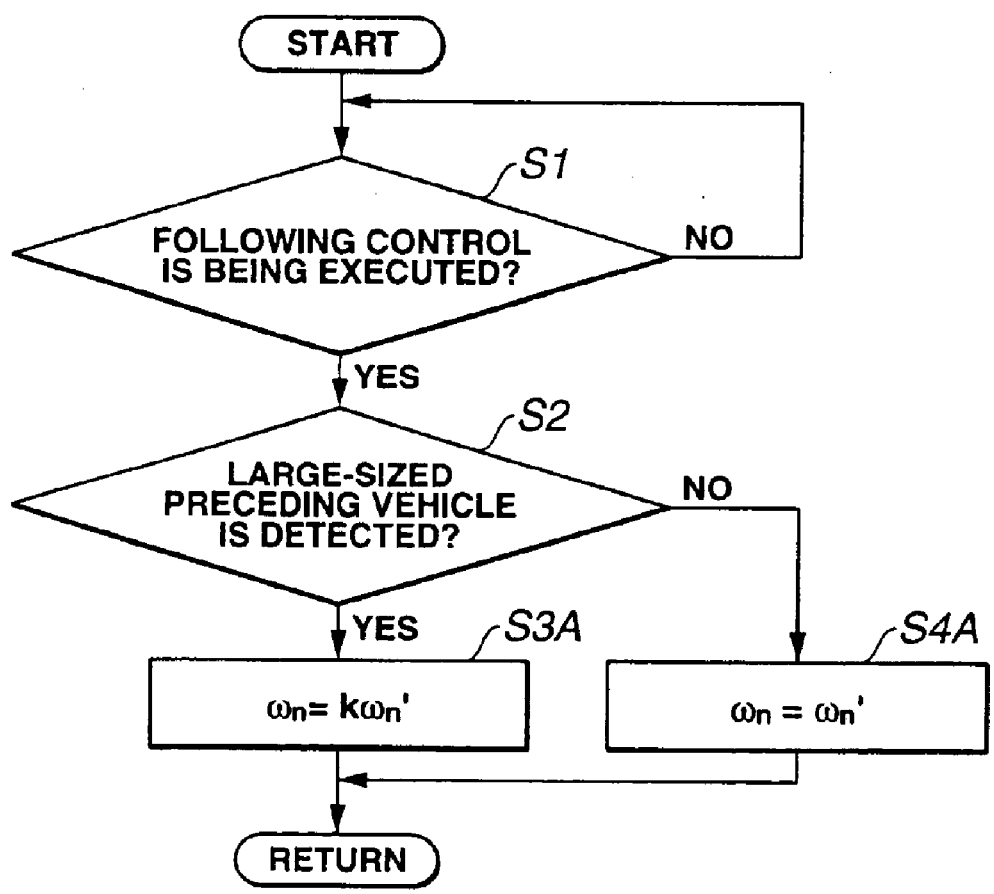
FIG. 12 is an operational flowchart representing a specific angular frequency setting process executed in the inter-vehicle distance controlling section in the second preferred embodiment of the adaptive cruise speed controlling apparatus according to the present invention.

FIG. 12 shows a flowchart representing a specific angular frequency setting procedure executed in a second preferred embodiment of the adaptive cruise speed controlling apparatus according to the present invention. The other structures of the adaptive cruise speed controlling apparatus in the second embodiment are generally the same as those described in the first embodiment. Hence, only different points from the first embodiment will be described below.

Specific angular frequency ωn is set to set control gains fd and fv. Inter-vehicle distance controlling section 502 executes this control at each predetermined time interval. FIG. 12 is generally the same as the damping coefficient setting process shown in FIG. 9 except steps S3A and S4A. That is to say, at step S3A, as the size (magnitude) of the preceding vehicle becomes large or inter-vehicle distance L to the preceding vehicle becomes short, a predetermined specific angular frequency candidate ωn' (for example, 0.2) is set with specific angular frequency candidate ωn' multiplied by a correction coefficient K smaller than "1" (0<K<1). Thereafter, the flowchart is returned to the main program. This correction coefficient K is a division of a rear surface area A of the average normal vehicle by a rear surface area B of the preceding vehicle. As shown in FIG. 10, as inter-vehicle distance L becomes short, the divisional value of A/B described above is carried out by being divided with coefficient $K_L$ as shown in FIG. 10 which becomes larger as inter-vehicle distance L becomes shorter.

On the other hand, at step S4A, specific angular frequency candidate ωn' is directly set as specific angular frequency ωn and the main program is returned.

Next, an operation of the adaptive cruise speed controlling apparatus in the second embodiment will be described below.

First, suppose that, while adaptive cruise speed controller 7 performs the preceding vehicle following control using normal control gains fd and fv, adaptive cruise speed controller 7 detects the preceding vehicle at inter-vehicle distance L larger than target inter-vehicle distance L* due to the traffic lane change of the traffic lane on which the vehicle and the preceding vehicle are running. At this time, the specific angular frequency setting process shown in FIG. 12 is executed at inter-vehicle distance controlling section 502 of adaptive cruise speed controller 7. As shown in FIG. 9, the determinations at steps S1 and S2 indicate "Yes" and, at step S3A, specific angular frequency ωn is set to be larger as the rear surface area B of the preceding vehicle becomes larger. In addition, control gain fv is set to be smaller in accordance with above equation (12) when specific angular frequency ωn is set to be larger. As described in equation (14), a gain (1−fv) in a term of the calculation equation associated with relative velocity ΔV in the calculation equation of target vehicular velocity V* is set to be larger. Hence, when host vehicle velocity V is larger than the vehicular velocity $V_T$ of the preceding vehicle, target vehicular velocity V* is set to be larger.

Then, suppose that, while the adaptive cruise speed controller 7 performs a following control using the normal mode gains fd and fv, adaptive cruise speed controller 7 detects the preceding vehicle at the inter-vehicle distance L larger than target inter-vehicle distance L*. Then, specific angular frequency ωn is set to be larger as rear surface area B of the preceding vehicle becomes larger when steps S1 and S2 answer "Yes". At step S3, as rear surface area B of the preceding vehicle becomes larger, specific angular frequency ωn is set to be larger. In addition, if specific angular frequency ωn is set to be larger, control gain fv is set to be smaller in accordance with above equation (12). As described in equation (14), a gain (1−fv) of relative velocity ΔV in calculation equation of target vehicular velocity V* is set to be larger. As vehicular velocity V becomes larger than vehicular velocity $V_T$ of the preceding vehicle, target vehicular velocity V* is remarkably reduced. As denoted by a solid line of FIG. 13, an overshoot crossing target inter-vehicle distance L* when the vehicle is approaching to the preceding vehicle is reduced. A sense such as if the vehicle were excessively approaching to the preceding vehicle is suppressed and the driver's sense of incompatibility can be prevented from being suppressed.

At this time, as the rear surface area B of the preceding vehicle becomes larger, specific angular frequency ωn is set to be larger. In other words, as inter-vehicle distance L to the preceding vehicle is felt to be shorter, the specific angular frequency ωn is set to be larger. Hence, the sense of incompatibility to the vehicle driver can accurately be suppressed.

Figure 13:
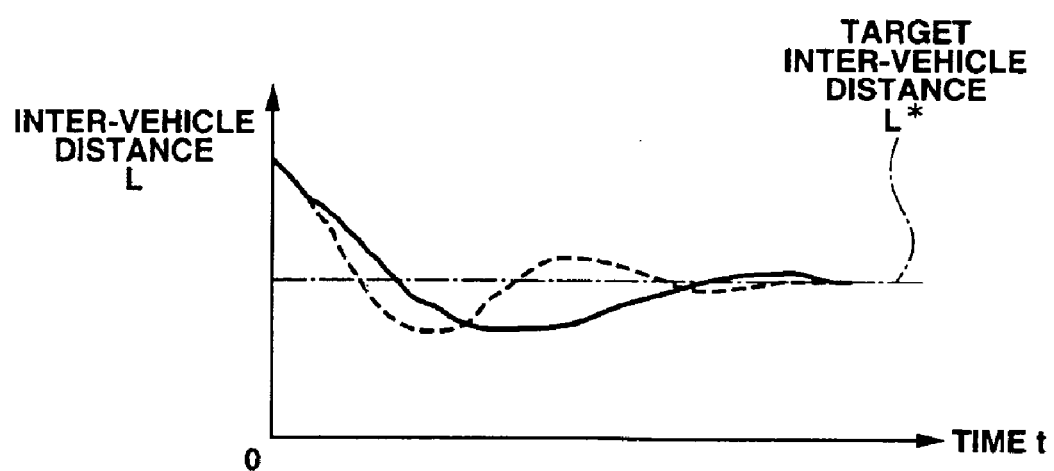
FIG. 13 is a characteristic graph for explaining an operation of the adaptive cruise speed controlling apparatus in the second embodiment shown in FIG. 12.

In a case where specific angular frequency ωn is not modified when the host vehicle is approaching to the large sized preceding vehicle (truck), inter-vehicle distance L from the host vehicle to the large-sized vehicle (truck) overshoots target inter-vehicle distance L*, as denoted by a broken line of FIG. 13. A magnitude of this overshoot is the same as the case where the preceding vehicle is not the large-sized vehicle. As described above, since the vehicle driver feels that, as the size of the preceding vehicle becomes larger, the inter-vehicle distance becomes short. The sense of incompatibility to the vehicle driver is given, the vehicle driver may feel that the host vehicle is approaching excessively to the large-sized preceding vehicle.

It is noted that, in each of the first and second embodiments, target inter-vehicle distance setting means (section) corresponds to target inter-vehicle distance setting section 503, inter-vehicle distance detecting section (means) corresponds to inter-vehicle distance sensor 1 and measured distance signal processing section 11, relative velocity detecting section corresponds to relative velocity calculating section 501, target vehicular velocity setting section corresponds to inter-vehicle distance control section 502, the vehicular velocity detecting section corresponds to vehicular velocity sensor 3 and vehicular velocity signal processing section 31, the driving and braking controlling section (means) correspond to vehicular velocity controlling section 51, and the preceding vehicle contour detecting means (section) corresponds to stereo camera unit 2 and image processing section 21.

Various changes and modifications may be made without departing from the scope and sprit of the present invention. For example, in each of the first and second embodiments, rear surface area B of the preceding vehicle is detected from the image of the front zone of the host vehicle photographed by means of stereo camera unit 2 and the magnitude of the preceding vehicle is detected according to the magnitude of rear surface area B. However, the present invention is not limited to this. For example, the magnitude of the preceding vehicle may be estimated from a frequency of reflections of a laser, as described in a Japanese Patent Application First Publication No. Heisei 7-186775 published on Jul. 25, 1995. It is also noted that a vehicular driving force defined in the claims is interpreted so as to include a vehicular braking force.

The entire contents of a Japanese Patent Application No. 2002-283258 (filed in Japan on Sep. 27, 2002) and No. 2002-283259 (filed in Japan on Sep. 27, 2002) are herein incorporated by reference. The scope of the invention is defined with reference to the following claims.

What is claimed is:

1. An adaptive cruise speed controlling apparatus for an automotive vehicle, comprising:
   a target vehicular velocity setting section that sets a target vehicular velocity in such a way that an addition value of a difference between a target inter-vehicle distance from the vehicle to a preceding vehicle, the preceding vehicle running ahead of the vehicle on the same traffic lane, and an actual inter-vehicle distance thereof multiplied by a first gain and a relative velocity between the vehicle and the preceding vehicle multiplied by a second gain is included in the set vehicular velocity; and a control gain setting section that sets the first and second gains to control a vehicular driving force to make the inter-vehicle distance substantially equal to the target inter-vehicle distance and to converge the inter-vehicle distance into the target inter-vehicle distance within a predetermined small overshoot crossing the target inter-vehicle distance when a size of an external form of the preceding vehicle is larger than a predetermined size.

2. An adaptive cruise speed controlling apparatus for an automotive vehicle as claimed in claim 1, wherein the first and second gains are set on the basis of both of a damping coefficient and a specific angular frequency and the specific angular frequency is set to be within a predetermined small angular frequency value when the size of the external form of the preceding vehicle is larger than the predetermined size.

3. An adaptive cruise speed controlling apparatus for an automotive vehicle as claimed in claim 1, wherein the control gain setting section sets the first and second gains on the basis of predetermined damping coefficient and predetermined specific angular frequency, the predetermined damping coefficient being set to be in excess of a predetermined large damping coefficient value when the size of the external form of the preceding vehicle is larger than the predetermined size.

4. An adaptive cruise speed controlling apparatus for an automotive vehicle, comprising:

a target inter-vehicle distance setting section that sets a target inter-vehicle distance between the vehicle and a preceding vehicle which is running ahead of the vehicle at the same traffic lane;

an inter-vehicle distance detecting section that detects an actual inter-vehicle distance between the vehicle and the preceding vehicle;

a relative velocity detecting section that detects a relative velocity of the vehicle to the preceding vehicle;

a target vehicular velocity setting section that sets a target vehicular velocity in such a way that an addition value between a value of difference between the target inter-vehicle distance set by the target inter-vehicle distance setting section and the inter-vehicle distance detected by the inter-vehicle distance detecting section multiplied with a first gain and a value of a second gain multiplied with the relative velocity detected by the relative velocity detecting section is included in the set vehicular velocity;

a vehicular velocity detecting section that detects the vehicular velocity of the vehicle;

a vehicular driving force controlling section that controls a vehicular driving force to make the inter-vehicle distance detected by the inter-vehicle distance detecting section substantially equal to the target inter-vehicle distance set by the target inter-vehicle distance setting section and to converge the inter-vehicle distance detected by the inter-vehicle distance detecting section into the target inter-vehicle distance set by the target inter-vehicle distance setting section; and a preceding vehicle external form detecting section that detects a magnitude of an external form of the preceding vehicle, the target vehicular velocity setting section setting the first and second gains in such a manner that the inter-vehicle distance is smoothly converged within a predetermined small overshoot crossing the target inter-vehicle distance into the target inter-vehicle distance when the magnitude of the external form of the preceding vehicle detected by the preceding vehicle external form detecting section is larger than a predetermined magnitude.

5. An adaptive cruise speed controlling apparatus for an automotive vehicle as claimed in claim 4, wherein the target vehicular velocity setting section sets the first and second gains on the basis of predetermined damping coefficient and specific angular frequency, the specific angular frequency being set to be a predetermined small specific angular frequency value when the magnitude of the external form of the preceding vehicle detected by the preceding vehicle external form detecting section is larger than a predetermined magnitude.

6. An adaptive cruise speed controlling apparatus for an automotive vehicle as claimed in claim 4, wherein the target vehicular velocity setting section sets the first and second gains on the basis of predetermined damping coefficient and specific angular frequency, the predetermined damping coefficient being set to be larger than a predetermined large damping coefficient value when the magnitude of the external form of the preceding vehicle is larger than the predetermined magnitude.

7. An adaptive cruise speed controlling apparatus for an automotive vehicle as claimed in claim 4, wherein the preceding vehicle external form detecting section detects an area of the external form of the preceding vehicle and the target vehicular velocity setting section sets the first and second gains in such a manner that the inter-vehicle distance is more smoothly converged with a predetermined small overshoot crossing the target inter-vehicle distance into the target inter-vehicle distance as the area of the external form of the preceding vehicle becomes larger.

8. An adaptive cruise speed controlling apparatus for an automotive vehicle as claimed in claim 7, wherein the preceding vehicle external form detecting section detects the area of the preceding vehicle and the first and second gains are set in such a manner that, as the area of the external form becomes wider, the inter-vehicle distance is more smoothly converged within a predetermined small overshoot crossing the target inter-vehicle distance and the first and second gains are set on the basis of predetermined damping coefficient and specific angular frequency, the predetermined specific angular frequency being set to be smaller than a predetermined small predetermined specific angular frequency value as the area of the external form of the preceding vehicle becomes wide.

9. An adaptive cruise speed controlling apparatus for an automotive vehicle as claimed in claim 7, wherein the preceding vehicle external form detecting section detects an area of an external form of the preceding vehicle and the target vehicular velocity setting section sets the damping coefficient to be larger as the area of the external form of the preceding vehicle becomes wider.

10. An adaptive cruise speed controlling apparatus for an automotive vehicle as claimed in claim 4, wherein the target vehicular velocity setting section sets the target vehicular velocity ($V^*$) as follows: $V^* = V - fd(L^* - L) + (1 - fv)\Delta V$, wherein V denotes the vehicular velocity, fd denotes the first gain, $L^*$ denotes the target inter-vehicle distance, L denotes the detected inter-vehicle distance, fv denotes the second gain, and $\Delta V$ denotes the relative velocity.

11. An adaptive cruise speed controlling apparatus for an automotive vehicle as claimed in claim 10, wherein $V + \Delta V =$ $V_T$, wherein $V_T$ denotes a vehicular velocity of the preceding vehicle and the target vehicular velocity (V*) is also expressed as $V^* = V_T - fd \cdot (L^* - L) - fv \cdot \Delta V$.

12. An adaptive cruise speed controlling apparatus for an automotive vehicle as claimed in claim 11, wherein the relative velocity detecting section (ΔV) includes a band pass filter (BPF) to detect the relative velocity from the actual inter-vehicle distance (L), the band pass filter having a transfer function F(s) as $F(a) = \omega c^2/(s^2 + 2\zeta\omega cs + \omega c^2)$, wherein $\omega c = 2\pi fc$ and fc denotes a cutoff frequency of the band pass filter, ζ denotes the damping coefficient, and s denotes a Laplace transform operator.

13. An adaptive cruise speed controlling apparatus for an automotive vehicle as claimed in claim 12, wherein the first gain $fd = \omega n^2 \cdot \tau v$ and the second gain $fv = 1 - 2\zeta\omega n \cdot \tau v$, wherein τv denotes a time constant of a vehicular servo system.

14. An adaptive cruise speed controlling apparatus for an automotive vehicle as claimed in claim 13, wherein a rear surface area of the preceding vehicle becomes larger, the damping coefficient (ζ) is set to be larger, the second gain (fv) is set to be larger, and a relative velocity gain (ΔV) in the calculation equation of the target vehicular velocity (V*) is set to be larger so that when the vehicular velocity is in excess of the vehicular velocity of the preceding vehicle ($V_T$), target vehicular velocity (V*) is remarkably reduced, the overshoot crossing the target inter-vehicle distance L* to approach to the preceding vehicle is reduced.

15. An adaptive cruise speed controlling apparatus for an automotive vehicle as claimed in claim 14, wherein the damping coefficient (ζ) is set in such a manner that a correction coefficient (K) which is larger than one is multiplied with a predetermined damping coefficient candidate (ζ').

16. An adaptive cruise speed controlling apparatus for an automotive vehicle as claimed in claim 13, wherein, as a rear surface area of the preceding vehicle becomes larger, the predetermined specific angular frequency (ωn) is set to be smaller, the first gain is set to become smaller, the second gain fv is set to become larger, and a convergence characteristic of the target inter-vehicle distance (L*) becomes more moderate so the approaching vehicular velocity to the preceding vehicle becomes relatively slow.

17. An adaptive cruise speed controlling apparatus for an automotive vehicle as claimed in claim 16, wherein the specific angular frequency (ωn) is set in such a manner that a correction coefficient (K) which is smaller than one is multiplied with a predetermined specific angular frequency candidate (ωn').

18. An adaptive cruise speed controlling apparatus for an automotive vehicle, comprising:

target inter-vehicle distance setting means for setting a target inter-vehicle distance between the vehicle and a preceding vehicle which is running ahead of the vehicle at the same traffic lane;

inter-vehicle distance detecting means for detecting an actual inter-vehicle distance between the vehicle and the preceding vehicle;

relative velocity detecting means for detecting a relative velocity of the vehicle to the preceding vehicle;

target vehicular velocity setting means for setting a target vehicular velocity in such a way that an addition value between a value of difference between the target inter-vehicle distance set by the target inter-vehicle distance setting means and the inter-vehicle distance detected by the inter-vehicle distance detecting means multiplied with a first gain and a value of a second gain multiplied with the relative velocity detected by the relative velocity detecting means is included in the set vehicular velocity;

vehicular velocity detecting means for detecting the vehicular velocity of the vehicle;

vehicular driving force controlling means for controlling a vehicular driving force to make the inter-vehicle distance detected by the inter-vehicle distance detecting means substantially equal to the target inter-vehicle distance set by the target inter-vehicle distance setting means and to converge the inter-vehicle distance detected by the inter-vehicle distance detecting means into the target inter-vehicle distance set by the target inter-vehicle distance setting means; and preceding vehicle external form detecting means for detecting a magnitude of an external form of the preceding vehicle, the target vehicular velocity setting means setting the first and second gains in such a manner that the inter-vehicle distance is smoothly converged within a predetermined small overshoot crossing the target inter-vehicle distance into the target inter-vehicle distance when the magnitude of the external form of the preceding vehicle detected by the preceding vehicle external form detecting means is larger than a predetermined magnitude.

19. An adaptive cruise speed controlling method for an automotive vehicle, comprising:

setting a target vehicular velocity in such a way that an addition value of a difference between a target inter-vehicle distance from the vehicle to a preceding vehicle, the preceding vehicle running ahead of the vehicle on the same traffic lane, and an actual inter-vehicle distance thereof multiplied by a first gain and a relative velocity between the vehicle and the preceding vehicle multiplied by a second gain is included in the set vehicular velocity; and setting the first and second gains to control a vehicular driving force to make the inter-vehicle distance substantially equal to the target inter-vehicle distance and to converge the inter-vehicle distance into the target inter-vehicle distance with a relatively small overshoot crossing the target inter-vehicle distance when a size of the preceding vehicle is larger than a predetermined size.

20. An adaptive cruise speed controlling method for an automotive vehicle, comprising:

setting a target inter-vehicle distance between the vehicle and a preceding vehicle which is running ahead of the vehicle at the same traffic lane;

detecting an actual inter-vehicle distance between the vehicle and the preceding vehicle;

detecting a relative velocity of the vehicle to the preceding vehicle;

setting a target vehicular velocity in such a way that an addition value between a value of difference between the set target inter-vehicle distance and the detected inter-vehicle distance multiplied with a first gain and a value of a second gain multiplied with the detected relative velocity is included in the set vehicular velocity;

detecting the vehicular velocity of the vehicle;

controlling a vehicular driving force to make the detected inter-vehicle distance substantially equal to the set target inter-vehicle distance and to converge the detected inter-vehicle distance into the set target inter-vehicle distance; and detecting a magnitude of an external form of the preceding vehicle, at the target vehicular velocity setting, the first and second gains being set in such a manner that the inter-vehicle distance is smoothly converged within a predetermined small overshoot crossing the target inter-vehicle distance into the target inter-vehicle distance when the detected magnitude of the external form of the preceding vehicle is larger than a predetermined magnitude.

* * * * *